(12) United States Patent
Yasuda et al.

(10) Patent No.: US 7,287,877 B2
(45) Date of Patent: Oct. 30, 2007

(54) VEHICULAR LIGHTING DEVICE AND BEAM WELDING METHOD

(75) Inventors: Ryosuke Yasuda, Shizuoka (JP); Fujihiko Sugiyama, Shizuoka (JP); Michihiko Suzuki, Shizuoka (JP); Kazuhiro Yamazaki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/301,503

(22) Filed: Dec. 13, 2005

(65) Prior Publication Data
US 2006/0126355 A1    Jun. 15, 2006

(30) Foreign Application Priority Data
Dec. 13, 2004  (JP) .............................. 2004-359657

(51) Int. Cl.
*F21V 29/00* (2006.01)

(52) U.S. Cl. ...................... 362/267; 362/259; 362/546; 264/1.37

(58) Field of Classification Search ................. 362/259, 362/267, 546; 264/1.37, 1.38, 1.9
See application file for complete search history.

(56) References Cited

U.S. PATENT DOCUMENTS

| | | | |
|---|---|---|---|
| 4,240,131 A | * | 12/1980 | Albrecht ...................... 362/267 |
| 4,636,609 A | | 1/1987 | Nakamata |
| 5,840,147 A | | 11/1998 | Grimm |
| 6,054,072 A | | 4/2000 | Bentley et al. |

* cited by examiner

*Primary Examiner*—Stephen F. Husar
(74) *Attorney, Agent, or Firm*—Osha Liang LLP

(57) ABSTRACT

A beam welding method in a vehicular lighting device where a transparent cover is mounted on a housing so as to cover its front face is characterized in that a transparent cover and a housing each includes a joining part. The method includes a step of integrating an elastic member with the joining part of the transparent cover, a step of bringing the elastic member into contact with the joining part of the housing, and a step of irradiating beams onto the joining part of the housing to weld the elastic member and the housing.

3 Claims, 3 Drawing Sheets

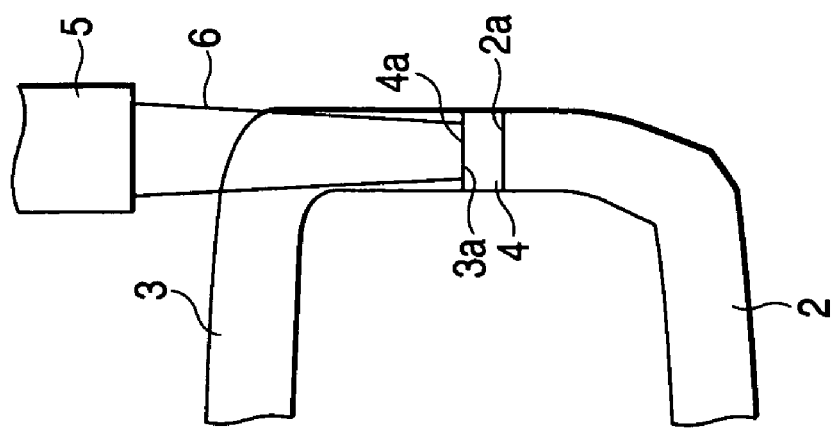
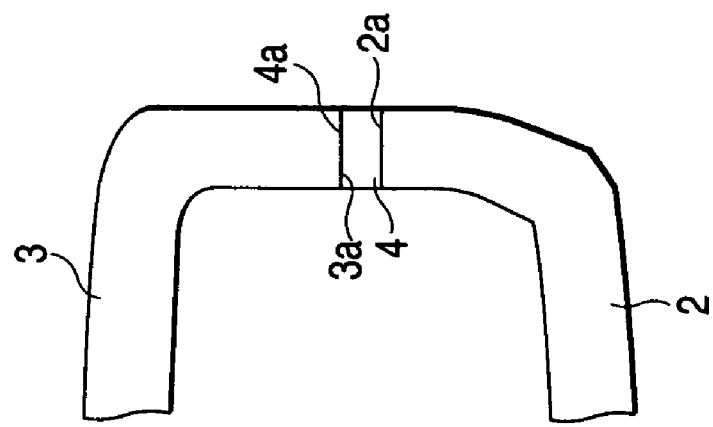
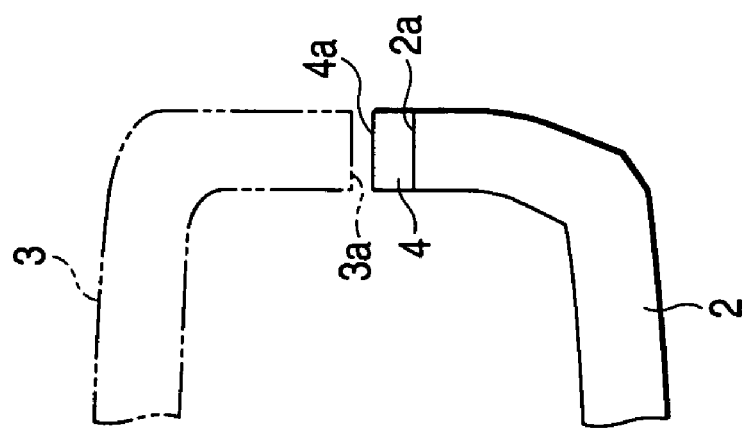

VEHICULAR LIGHTING DEVICE AND BEAM WELDING METHOD

BACKGROUND OF THE INVENTION

1. Technical Field

The present invention relates to a vehicular lighting device and a beam welding method, and in particular to a technology for reliably joining the housing of a vehicular lighting device and a transparent cover by way of beam welding.

2. Related Art

In the manufacture of a vehicular lighting device, for example an automobile lighting device, a process is required to mount a transparent cover generally called a lens onto a housing so as to cover its front opening.

In the related art, a method was generally used for protruding seal legs on the peripheral edge of a transparent cover, forming a groove that receives the seal legs on a housing, and receiving the seal legs of the transparent cover by the groove of the housing via a sealant or an adhesive in order to mount the transparent cover onto the housing. In this mounting method, the seal legs and the groove are provided at a position protruded outward from the peripheral edge of the transparent cover or housing. When the transparent cover is viewed from the front, its peripheral edge includes a portion occupying a relatively large area that does not transmit light, or a dark portion. This results in a smaller light-emitting area with respect to the entire area of the transparent cover.

One solution to this problem was a method for directly joining the seal legs of the transparent cover to the joining surface of the housing. By directly joining the seal legs of the transparent cover to the housing, the resulting joining margin has a very small width and the dark portion of the peripheral edge of the transparent cover occupies a very narrow width. The direct joining means has been generally hot plate welding or vibration welding. For such means, the melted materials of the transparent cover and the housing are mixed and then cooled and solidified at the joining part of the transparent cover and the housing. The drawback of this method is that excessive molten material oozes from the joining part, which impairs the external appearance as seen through the transparent cover from the front.

This method also has restrictions on the shape. These include: the tilt angle is limited; an almost flat surface is required in the direction of vibration in vibration welding; and excessive tilting is not allowed with respect to the direction the hot plate is applied in hot plate welding. As such, this approach cannot meet today's need for three-dimensional designs.

Another method joins the transparent cover and the housing via laser welding. In laser welding, by controlling the laser output and the spot diameter at the joining part as well as the scan speed, the melting state of the material, that is, the irradiation energy at the joining part can be controlled to a certain degree. This prevents oozing of the molten material caused by excessive melting as well as supports a complicated shape. By irradiating laser beams onto the housing through the transparent cover, the housing is heated and melted, which transfers heat to the transparent cover to cause it to melt, thus compatibilizing and welding them both.

In the beam welding such as laser welding, insecure contact between the welding part of the transparent cover and that of the housing will result in poor joining.

The transparent cover and the housing of a vehicular lighting device are resin molded items. Influenced by curling or deformation that follows molding, the intended shape is difficult to obtain in reality. Thus, it is difficult to keep the transparent cover in close contact with the housing along the entire circumference. Poor contact between the transparent cover and the housing prevents heat given to the housing by irradiation of laser beams from being transferred to the transparent cover, thus disabling the welding process.

SUMMARY OF THE INVENTION

One or more embodiments of the invention provide good contact between a transparent cover and a housing in joining the transparent cover and the housing via beam welding.

In view of the above, one or more embodiments of the invention provide a beam welding method characterized in that a transparent cover and a housing each comprises a joining part, the method comprising a step of integrating an elastic member with the joining part of the transparent cover, a step of bringing the elastic member into contact with the joining part of the housing, and a step of irradiating beams onto the joining part of the housing to weld the elastic member and the housing.

In view of the above, one or more embodiments of the invention provide another beam welding method characterized in that a transparent cover and a housing each comprises a joining part, the method comprising a step of integrating an elastic member with the joining part of the housing, a step of bringing the elastic member into contact with the joining part of the transparent cover, and a step of irradiating beams onto the part the elastic member is in contact with the joining part of the transparent cover to weld the elastic member and the transparent cover.

In view of the above, one or more embodiments of the invention provide a vehicular lighting device characterized in that an elastic member is interposed between the joining part of a transparent cover and the joining part of a housing, that the elastic member is integrated with the housing or transparent cover, and that the elastic member and the transparent cover or housing are beam-welded.

According to one or more embodiments of the invention, good contact is provided between the elastic member and the joining part of the transparent cover or joining part of the housing.

One or more embodiments of the invention provide a beam welding method in a vehicular lighting device where a transparent cover is mounted on a housing so as to cover its front face, characterized in that a transparent cover and a housing each comprises a joining part, the method comprising a step of integrating an elastic member with the joining part of the transparent cover, a step of bringing the elastic member into contact with the joining part of the housing, and a step of irradiating beams onto the joining part of the housing to weld the elastic member and the housing.

One or more embodiments of the invention provide another beam welding method in a vehicular lighting device where a transparent cover is mounted on a housing so as to cover its front face, characterized in that a transparent cover and a housing each comprises a joining part, the method comprising a step of integrating an elastic member with the joining part of the housing, a step of bringing the elastic member into contact with the joining part of the transparent cover, and a step of irradiating beams onto the part the elastic member is in contact with the joining part of the transparent cover to weld the elastic member and the transparent cover.

One or more embodiments of the invention provide a vehicular lighting device where a transparent cover is mounted on a housing so as to cover its front face, characterized in that an elastic member is interposed between the joining part of a transparent cover and the joining part of a housing, that the elastic member is integrated with the housing or transparent cover, and that the elastic member and the transparent cover or housing are beam-welded.

In accordance with one or more embodiments of the invention, an elastic member is integrated with the joining part of a housing or joining part of a transparent cover. Even in case a gap may be generated somewhere between the two joining parts in bringing the joining part of the housing into contact with the joining part of the transparent cover, the elastic member deforms so that the joining part of the housing and the joining part of the transparent cover are in contact with each other along the entire circumference via the elastic member. This assures reliable beam welding.

BRIEF DESCRIPTION OF THE DRAWINGS

FIG. 2A shows a step of integrating an elastic member with a housing in an embodiment where an elastic member is integrated with a housing;

FIG. 2B shows a step of bringing the housing into contact with the transparent cover in an embodiment where an elastic member is integrated with a housing;

FIG. 2C shows a step of irradiating beams in an embodiment where an elastic member is integrated with a housing;

DETAILED DESCRIPTION OF THE INVENTION

Figure 1:
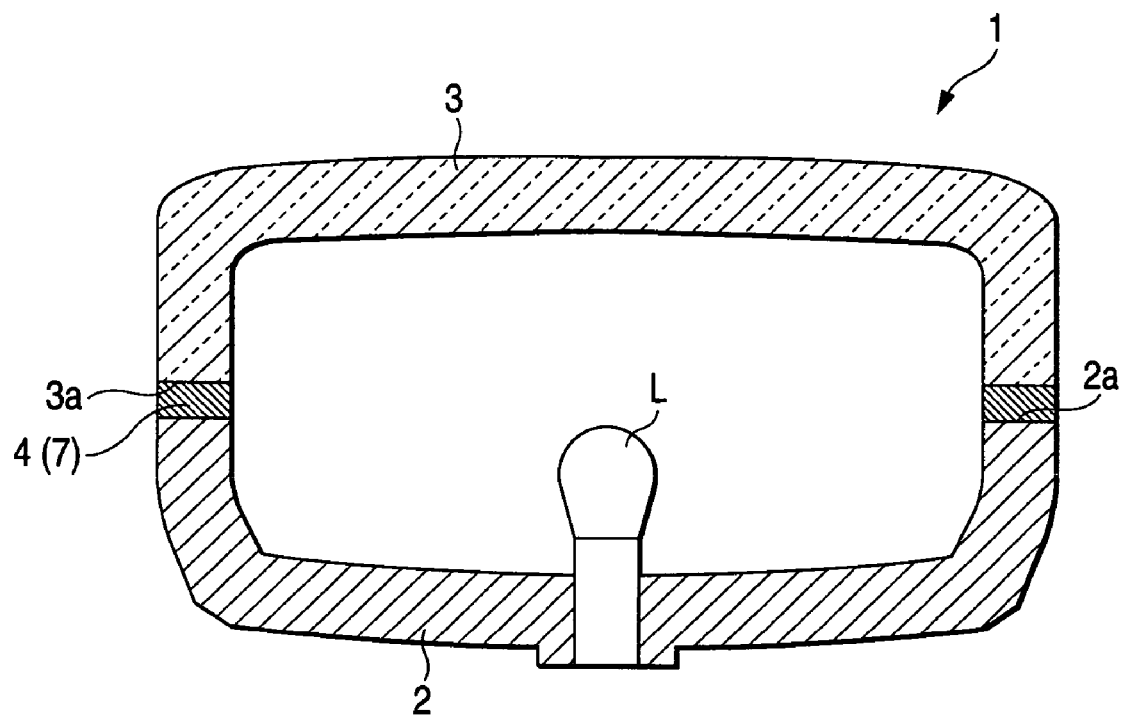
FIG. 1 is a schematic vertical cross section showing an embodiment of a vehicular lighting device according to an embodiment of the invention.

Embodiments for implementing a vehicular lighting device and beam welding apparatus according to the invention will be described in detail below referring to the attached drawings.

A vehicular lighting device 1 has a transparent cover 3 mounted on a housing 2 so as to cover its front face. A light source L is arranged in a space enclosed by the housing 2 and the transparent cover 3. Joining parts 2a, 3a are respectively formed on the housing 2 and the transparent cover 3. Between the joining parts 2a, 3a is interposed an elastic member 4 or 7. The elastic member 4 or 7 is molded in one piece with the joining surface 2a of the housing 2 or the joining surface 3a of the transparent cover 3. The welding surface opposite to a surface of the elastic member 4 or 7 integrated with the housing 2 or the transparent cover 3 is joined with the joining surface 3a of the transparent cover 3 or the joining surface 2a of the housing 2 via beam welding.

Next, a method for beam-welding the housing 2 with the transparent cover 3 will be described.

FIG. 2 shows an embodiment where an elastic member 4 is integrated with the joining part 2a of the housing 2.

The elastic member 4 is formed of a material that has elasticity similar to that of rubber, shows a good weldability with the resin material of the housing 2 and is excited and heated by irradiation of beams. For example, the elastic member 4 is integrated with the housing 2 via a forming method called two-color molding or insert molding (refer to FIG. 2A).

In the above process, the joining surface 3a of the transparent cover 3 is positioned on the welding surface 4a of the elastic member 4 integral with the housing 2 opposite to a surface of the elastic member 4 joined with the housing 2. In this state, the transparent cover 3 is pushed toward the housing 2 with an appropriate jig (not shown). As a result, even in case a gap is generated between the joining surface 3a of the transparent cover 3 and the welding surface 4a of the elastic member 4, the elastic member 4 undergoes elastic deformation so as to provide perfect contact between the welding surface 4a of the elastic member 4 and the joining surface 3a of the transparent cover 3 (refer to FIG. 2B).

In the above process, predetermined beams 6 are irradiated by a beam irradiating part 5 onto the welding surface 4a of the elastic member 4 in contact with the joining part 3a of the transparent cover 3 through the transparent cover 3 while the state is maintained where the welding surface 4a of the elastic member 4 is in perfect contact with the joining surface 3a of the transparent cover 3. The beam irradiating part 5 is for example a laser gun and irradiates predetermined beams, for example laser beams. The beams 6 irradiated in this example are not limited to laser beams. That is, coherent or incoherent electromagnetic waves such as visible light, ultraviolet rays, or infrared rays as well as laser beams may be used as required as long as irradiation of the electromagnetic wave may excite the welding surface 4a of the elastic member 4. That is, a material having a molecular structure of a radical whose vibration period is the same as the wavelength of the electromagnetic wave to be irradiated is used as a material of the elastic member 4. In case the material of the elastic member 4 is not excited by irradiation of the beams, a material that may be excited by irradiation of the beams may be mixed with the material of the elastic member 4. Or, such a material may be deposited via application on the welding surface 4a of the elastic member 4 that is in contact with the joining part 3a of the transparent cover 3. For example, in case laser beams are irradiated, a laser absorbing material may be mixed with the material of the elastic member 4 or deposited via application on the welding surface 4a of the elastic member 4.

When the beams 6 are irradiated onto the welding surface 4a of the elastic member 4 by the beam irradiation part 5, the welding surface 4a of the elastic member 4 is excited and heated. When the welding surface 4a of the elastic member 4 is heated, the heat is transmitted to the joining surface 3a (surface in contact with the welding surface 4a of the elastic member 4) of the transparent cover 3, which heats both surfaces 4a and 3a thus leading to a compatibilized state. On the interface where the two surfaces 4a and 3a are in contact, the material of the elastic member 4 and that of the transparent cover 3 are integrated.

In this way, the joining parts 2a, 3a of the housing 2 and the transparent cover 3 are joined together via the elastic member 4.

Figure 3A:
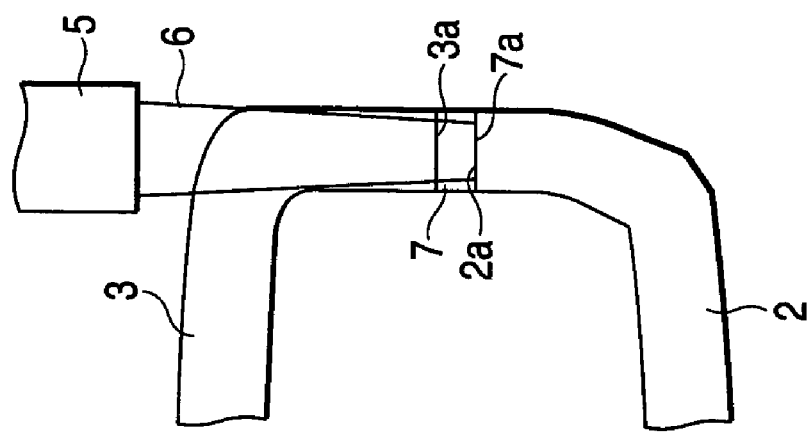
FIG. 3A shows a step of integrating an elastic member with a transparent cover an embodiment where an elastic member is integrated with a transparent cover.
Figure 3B:
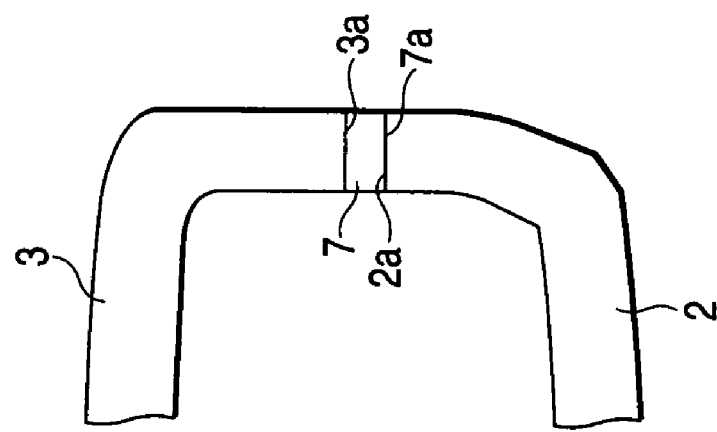
FIG. 3B shows a step of bringing the housing into contact with the transparent cover in an embodiment where an elastic member is integrated with a transparent cover.
Figure 3C:
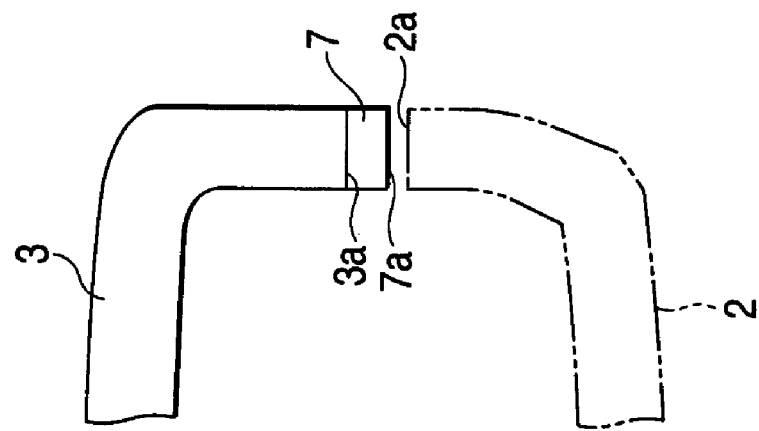
FIG. 3C shows a step of irradiating beams in an embodiment where an elastic member is integrated with a transparent cover.

FIG. 3 shows an embodiment where an elastic member 7 is integrated with the joining part 3a of the transparent cover 3.

The elastic member 7 is formed of a material that has elasticity similar to that of rubber, shows a good weldability with the resin material of the transparent cover 3 and allows transmission of beams. For example, the elastic member 7 is integrated with the transparent cover 3 via a forming method called two-color molding or insert molding (refer to FIG. 3A).

In the above process, the welding surface 7a of the elastic member 7a opposite to a surface of the elastic member 7 integral with the transparent cover 3 joined with the transparent cover 3 is overlaid on joining part 2a of the housing 2. In this state, the transparent cover 3 is pushed toward the housing 2 with an appropriate jig (not shown). As a result, even in case a gap is generated between the joining surface 2a of the housing 2 and the welding surface 7a of the elastic member 7, the elastic member 7 undergoes elastic deformation so as to provide perfect contact between the welding surface 7a of the elastic member 7 and the joining surface 2a of the housing 2 (refer to FIG. 3B).

In the above process, predetermined beams 6 are irradiated by a beam irradiating part 5 onto the joining part 2a of the housing 2 in contact with the elastic member 7 through the transparent cover 3 and the elastic member 7 while the state is maintained where the welding surface 7a of the elastic member 7 is in perfect contact with the joining surface 2a of the housing 2. The beam irradiating part 5 is similar to that in the embodiment shown in FIG. 2. The beam irradiating part 5 may be any unit capable of irradiating coherent or incoherent electromagnetic waves such as visible light, ultraviolet rays, or infrared rays as well as laser beams as required may be used. That is, a material having a molecular structure of a radical whose vibration period is the same as the wavelength of the electromagnetic wave to be irradiated is used as a material of the housing 2. In case the material of the housing 2 is not excited by irradiation of the beams, a material that may be excited by irradiation of the beams may be mixed with the material of the housing 2. Or, such a material may be deposited via application on the joining part 2a of the housing 2. For example, in case laser beams are irradiated, a laser absorbing material may be mixed with the material of the housing 2 or deposited via application on the joining part 2a of the housing 2.

When the beams 6 are irradiated onto the joining part 2a of the housing 2 by the beam irradiation part 5, joining part 2a of the housing 2 is excited and heated. When the joining part 2a of the housing 2 is heated, the heat is transmitted to the welding surface 7a of the elastic member 7 integral with the transparent cover in contact with the joining part 2a, which heats both surfaces 2a and 7a thus leading to a compatibilized state. On the interface where the two surfaces 2a and 7a are in contact, the material of the elastic member 7 and that of the housing 2 are integrated.

In this way, the joining parts 2a, 3a of the housing 2 and the transparent cover 3 are joined together via the elastic member 7.

As described above, according to one or more embodiments of the invention, an elastic member 4 or 7 is interposed between the joining part 2a of the housing 2 and the joining part 3a of the transparent cover 3. This secures contact between surfaces to be beam-welded and prevents poor welding.

The shape and structure of each part shown in the above description are only an exemplary embodiment for implementing the invention. These examples should not be construed as limiting the technical scope of the invention.

In one or more embodiments of the invention, it is possible to reliably perform beam welding between a housing and a transparent cover that each has a large size and has difficulty in bringing the joining part into overall contact.

We claim:

1. A beam welding method in a vehicular lighting device where a transparent cover is mounted on a housing so as to cover a front face thereof, characterized in that
the transparent cover and the housing each comprise a joining part, said method comprising
a step of integrating an elastic member with the joining part of the transparent cover,
a step of bringing the elastic member into contact with the joining part of the housing, and
a step of irradiating beams onto the joining part of the housing to weld the elastic member and the housing.

2. A beam welding method in a vehicular lighting device where a transparent cover is mounted on a housing so as to cover a front face thereof, characterized in that
the transparent cover and the housing each comprise a joining part, said method comprising
a step of integrating an elastic member with the joining part of the housing,
a step of bringing the elastic member into contact with the joining part of the transparent cover, and
a step of irradiating beams onto a part of the elastic member that is in contact with the joining part of the transparent cover to weld the elastic member and the transparent cover.

3. A vehicular lighting device where a transparent cover is mounted on a housing so as to cover a front face thereof, characterized in that
an elastic member is interposed between a joining part of the transparent cover and a joining part of the housing,
the elastic member is integrated with the housing or transparent cover, and
the elastic member and the transparent cover or housing are beam-welded.

\* \* \* \* \*